United States Patent [19]

Sapino, Jr. et al.

[11] 3,912,719
[45] Oct. 14, 1975

[54] PRODUCTION OF SEMISYNTHETIC PENICILLINS

[75] Inventors: Chester Sapino, Jr., East Syracuse; Albert Louis Vulcano, Liverpool; Steven Peter Brundidge, Wolcott; James David Mahan, Syracuse, all of N.Y.

[73] Assignee: Bristol-Myers Company, New York, N.Y.

[22] Filed: Jan. 28, 1974

[21] Appl. No.: 437,459

[52] U.S. Cl. ............................................. 260/239.1
[51] Int. Cl.² ...................................... C07D 499/44
[58] Field of Search ...................... 260/239.1, 243 C

[56] References Cited
UNITED STATES PATENTS
3,499,909  3/1970  Weissenburger et al. ....... 260/239.1

OTHER PUBLICATIONS
Flynn, "Cephalosporins and Penicillins," pp. 64–73, (1972).

Primary Examiner—Gerald A. Schwartz
Attorney, Agent, or Firm—Herbert W. Taylor, Jr.

[57] ABSTRACT

The old process for producing a synthetic penicillin, e.g. ampicillin or amoxicillin, which consisted of acylating solid 6-aminopenicillanic acid (6-APA) with an acid chloride (or chloride hydrochloride) after preparing the 6-APA by converting a silylated natural penicillin to an imino-chloride, as with $PCl_5$, and thence to an imino-ether, as with methanol, and thence to 6-APA by hydrolysis followed by recovery of the solid 6-APA has been rendered more efficient and capable of being conducted in a single vessel by maintaining the imino-ether solution in the hydrolysis step at —50°C. while adding a volume of water no greater than 10% of the volume of the imino-ether solution to produce a single phase containing 6-aminopenicillanic acid which is then acylated with an acid chloride (or chloride hydrochloride) at about —40°C. after the addition of a weak tertiary amine to produce the synthetic penicillin.

68 Claims, No Drawings

PRODUCTION OF SEMISYNTHETIC PENICILLINS

BACKGROUND OF THE INVENTION

1. Field of the Invention

The present invention provides an improved and more efficient commercial process for the production of semisynthetic penicillins directly from penicillin B or penicillin V.

2. Description of the Prior Art

Many semisynthetic penicillins and processes for their synthesis have been described in the scientific and patent literature as reported, for example, In U.S. Class 260-239.1. On a commercial scale they are most commonly manufactured by reacting an acid chloride (or an acid chloride hydrochloride if a free amino group is present in the prospective sidechain and requires blocking by protonation) with a solution of 6-aminopenicillanic acid (6-APA). Ordinary aqueous solutions obviously cannot be used when the acid chloride is too reactive and would be decomposed to any significant extent by the water before it could react with the 6-APA. This has led to wide use of pure, solid 6-APA which is prepared and isolated in one process and then dissolved in some manner in an anhydrous solvent and acylated in a second process to produce the penicillin. The solid 6-APA is usually prepared from the readily available natural penicillin G or penicillin V by deacylation either by enzymes (e.g., per Bayer's U.S. Pat. No. 3,260,653) or chemically by treatment with $PCl_5$ and methanol to form an imino-ether which is readily hydrolyzed to give 6-APA which is then recovered as a pure dry solid (e.g. per Gist's U.S. Pat. Nos. 3,499,909 and 3,676,429). Silyl esters are used as protective and solubilizing groups in the latter process.

Thus ampicillin and/or amoxicillin have been prepared form pure, solid 6-APA as described, for example, in U.S. Pat. No. 3,140,282; U.K. Pat. Nos. 938,321, 959,853, 1,339,605; U.S. Pat. Nos. 3,478,018, 3,479,338, 3,520,876 3,595,855, 3,741,959, 3,654,266 and 3,678,037. Many of these patents utilize the silyl esters of 6-APA apparently first described in U.S. Pat. No. 3,249,622 (and see U.K. Pat. Nos. 964,449 and 1,008,468) and reacted therein with α-phenoxypropionyl chloride and the like. See also U.S. Pat. No. 3,304,301.

U.K. Pat. No. 1,336,328 states that a. The following literature references relate to the production of silylated penicillins or cephalosporins from penicillins or cephalosporins: Belgin patent specification No. 718,824; published Dutch Pat. application Nos. 66 06 872; 67 13 809 and 67 10 835 and U.S. Pat. specification No. 2,746,956.

b. The following literature references relate to the production of silylated 6-aminopenicillanic acid and its conversion into silylated penicillins: Belgian Pat. specification Nos. 615,344; 615,401 and 653,862; British patent specification Nos. 959,853; 964,449 and 1,008,468; German patent specification No. 1,159,449; German Offenlegungsschrift Nos. 1,800,698; 1,814,085; 1,912,904; 1,923,624; 1,931,097 and 1,932,351; published Dutch Patent application Nos. 64 01 841; 66 11 888; 68 00 768 and 68 18 057; Swedish patent specification No. 310,179; Swiss patent specification No. 446,336; and U.S. patent specification No. 3,479,338.

c. The following literature references relate to the production of silylated 7-aminocephalosporanic acids and their conversion into silylated cephalosporins: Belgian patent specification No. 737,761; Bristish patent specification No. 1,073,530; and published Dutch patent applications No. 67 17 107 and 68 18 868.

It would clearly be advantageous to combine these two processes into a single unitary process and that was the objective of the present invention. The basic obstacle encountered in combining reactions without isolation and purification of intermediate products (in this case the pure, solid 6-APA) is that one is also combining all the undesirable by-products of the reactions and other impurities, degradation products, unused reactants, solubilizing and buffering agents and the like.

SUMMARY OF THE INVENTION

In the process for producing a synthetic penicillin (e.g. amoxicillin or ampicillin) from a natural penicillin such as penicillin G or penicillin V by the consecutive steps of a. forming a solution in an anhydrous, unreactive organic solvent (preferably methylene chloride) of a silyl ester of said natural penicillin [preferably made by reaction of said natural penicillin with dichlorodimethylsilane (DDS) or hexamethyldisilazane HMDS) or trimethylchlorosilane (TMCS)] in the presence of a weal tertiary amine (preferably dimethylaniline), b) adding at below 0°C. (and preferably below −20°C. and especially below −40°C.) a halogenating agent (and preferably an acid halide and especially phosphorus pentachloride) to form a solution of the imino-halide, c) mixing said solution at below −20°C. (and preferably below −40°C.) with alcohol (and preferably a lower alkanol and especially methanol) to form a solution of the imino-ether, d) mixing said solution with water to produce 6-amino-penicillanic acid in a biphasic system, e) isolating said 6-aminopenicillanic acid as a solid, f) redissolving it in a solvent and g) adding thereto a carboxylic acid chloride (e.g. D-(-)-2-p-hydroxyphenylglycyl chloride hydrochloride or D-(-)-2-phenylglycyl chloride hydrochloride) as an acylating agent to produce said synthetic penicillin, this invention provides the improvement which comprises maintaining the imino-ether solution in the hydrolysis step at −50°C. while adding a volume of water no greater than 10% (and preferably no greater than 8%) of the volume of the imino-ether solution to produce a single phase containing 6-aminopenicillanic acid which is then, without intermediate isolation of the 6-aminopenicillanic acid, acylated at about −40°C. after the addition of a weak tertiary amine (preferably N,N-dimethylaniline) to produce said synthetic penicillin.

In its more specific embodiments the present invention provides for the use of the process described above to produce ampicillin by the use of D-(-)-2-phenylglycyl chloride hydrochloride and amoxicillin by the use of D-(-)-2-p-hydroxyphenylglycyl chloride hydrochloride and epicillin by the use of D-(-)-2-amino-2-(1,4-cyclohexadien-1-yl)acetyl chloride hydrochloride and cyclacillin by the use of 1-aminocyclohexanecarboxyl chloride hydrochloride and methicillin by the use of 2,6-dimethoxybenzoyl chloride and nafcillin by the use of 2-ethoxy-1-naphthoyl chloride and oxacillin by the use of 5-methyl-3-phenyl-4-isoxazole-carbonyl chloride and cloxacillin by the use of 5-methyl-3-(2'-chlorophenyl)-4-isoxazole-carbonyl chloride and dicloxacillin by the use of 5-methyl-3-(2',6'-dichlorophenyl)-4-isoxazole-carbonyl chloride and flucloxacillin (floxacillin) by the use of 5-methyl-3-(2'-chloro-6'-fluorophenyl)-4-isoxazole-carbonyl chloride and indanyl carbenicillin by the use of 5-indanyl phenylmalonyl chloride and 6-[D-α-(3-guanyl-1-ureido)-phenylacetamido]-penicillanic acid by the use of D-α-(3-guanyl-1-ureido)phenylacetyl chloride hydrochloride and levopropylcillin by the use of (-)-2-phenoxybutyryl chloride and sulfocillin (sulbenicillin; sulfobenzylpenicillin) by the use of α-sulphophenylacetyl chloride and azidocillin by the use of D-(-)-α-azidophenylacetyl chloride and 3,4-dichloro-α-methoxybenzylpenicillin by the use of 3,4-dichloro-α-methoxyphenylacetyl chloride and 6-[D-m-chloro-p-hydroxyphenylacetamido]penicillanic acid (U.S. Pat. No. 3,489,746) by the use of D-(-)-2-m-chloro-p-hydroxyphenylglycyl chloride hydrochloride and 6-[D-α-amino-(2-thienyl)acetamido] penicillanic acid by the use of D-(-)-α-(2-thienyl)-glycyl chloride hydrochloride and 6-[D-α-amino-(3-thienyl)acetamido] penicillanic acid by the use of D-(-)-α-(3-thienyl)glycyl chloride hydrochloride.

The present invention is further illustrated specifically in terms of ampicillin and amoxicillin by Scheme I below and the discussion and results which follow Scheme I.

SCHEME I

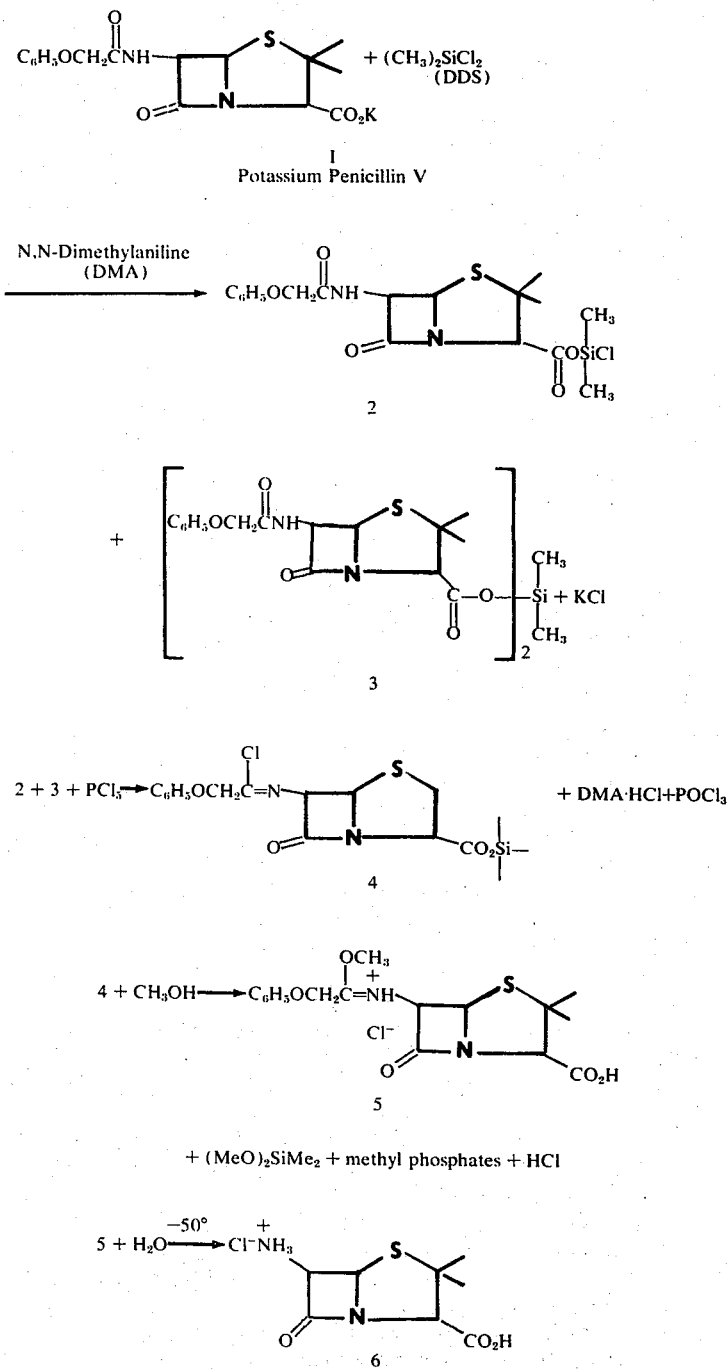

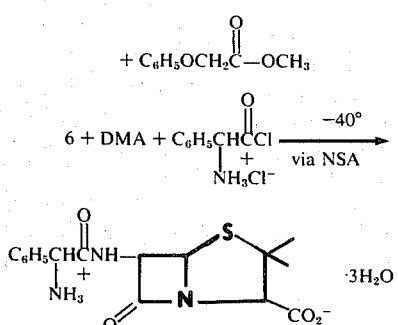

The esterification of penicillin V potassium (1) in methylene chloride solution at 25° with dimethyldichlorosilane (DDS) in the presence of N,N-dimethylaniline gives rise to a mixture of monomer ester (2) and dimer ester (3) (Scheme I). Low levels of DDS (0.60 moles/moles pen V) give predominantly dimer ester (3), whereas high levels of DDS (0.9–1.1 moles/mole pen V) give rise to a mixture of both (2) and (3); monomer ester predominating. In either case, the esterification is essentially quantitative. Long term stability studies indicate that the preferred technique for esterification is to add all of the DMA required for the cleavage (2.7–3.0 moles/mole pen V) to the suspension of pen V K salt in methylene chloride, prior to adding the DDS. This esterification mixture shows no tendency to undergo degradation after 16 hours at 25°. An examination of esterification mixtures (0.94 moles DDS + 0.22 moles DMA/mole pen V) after 16 hours showed approximately 9% degradation of the silyl ester to a compound tentatively assigned as the O-silylated amide, (8)

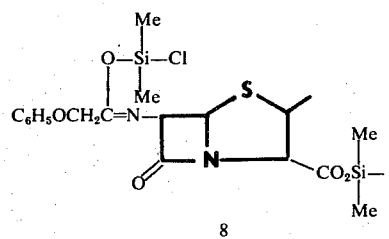

The treatment of the silylation mixture with phosphorous pentachloride (1.1–1.2 moles/mole Pen V) at −40° gives rise to the chloroimide (4). After 2 hours chlorination was quantitative and free from undesirable side reactions. No degradation was observed after 8 hours at −40°.

The dropwise addition of precooled (−60°) anhydrous methanol to the chlorination mix (this order of addition is preferred), maintaining the temperature at −50°, produces the imino ether hydrochloride free acid (5) after 1–2 hours reaction time at −50°. The alcoholysis reactions of the chloroimide and the silyl ester are quantitative and also free from any undesirable side reactions; the latter reaction occurring within 10–15 minutes at −50°.

The addition of 2.5–3% water by volume of methylation mix at −50° rapidly (e.g. within 5 minutes) cleaves the imino ether to 6-APA and methy phenoxyacetate. This reaction is nearly quantitative. In addition, there is no evidence to suggest that β-lactam breakage occurs during this step. Empirical data have shown that no loss of 6-APA occurs over 16 hours in this hydrolysis mix if it is stored that long.

The overall conversion of penicillin V to 6-APA in this process approaches 98–99%. Residual penicillin V assays of spent mother liquors are generally under 1%.

The resulting solution of 6-APA is treated with DMA at −50°, followed by the addition of D-(−)-phenylglycyl chloride hydrochloride (PGH) at −40°. After aqueous quench and workup via NSA/MILA, pure ampicillin trihydrate is produced in yields of 68–80% overall from penicillin V K salt.

Further laboratory investigations were then carried out by hydrolyzing methylation mix (prepared by adding chlorimide to methanol) with 6volume percent water at −45°, followed by acylation at this temperature with varying levels of DMA and PGH. Table I summarizes the effects of base and acid chloride on in-solution yields of ampicillin.

It appeared that the best conditions for acylation involved the use of 6–6.2 eq. of DMA and 1.1–1.3 eq. PGH (run numbers 9 and 10) at −45°. These conditions gave rise to 69–72% of ampicillin in solution. Higher mole ratios of PGH (run numbers 4, 8, 12, 16) apparently resulted in over acylation of 6-APA (acylation of ampicillin), whereas lower levels of both DMA and PGH apparently resulted in incomplete acylation of the 6-APA (run numbers 1–4).

A study of the effect of temperature on in solution yields of ampicillin was also carried out using the DMA/PGH levels described in Run No. 10 (Table 1). In these instances, methylation mix was prepared from known potency pen V K salt via esterification with DDS, chlorination with phosphorous pentachloride and by the addition of 25 eq. of methanol to the chlorimide. maintaining the addition temperature below −50°. The single phase methylation mix was hydrolyzed at −50° with 2.6% water based on the volume of the methylation mix, and acylated at the temperatures described in Table II.

TABLE I

The Effect of DMA and PGH Levels on Ampicillin

Yields in Solution

TABLE I—Continued

| Run No. | Moles of DMA added for Acylation | Moles of PGH added for Acylation | Calculated[1] % Ampi Free Acid in Soln.[2] |
|---|---|---|---|
| 1 | 4.0 | 1.1 | 25.4 |
| 2 | 4.2 | 1.3 | 21.9 |
| 3 | 4.4 | 1.5 | 26.0 |
| 4 | 4.6 | 1.7 | 14.7 |
| 5 | 5.0 | 1.1 | 38.7 |
| 6 | 5.2 | 1.3 | 40.1 |
| 7 | 5.4 | 1.5 | 50.0 |
| 8 | 5.6 | 1.7 | 40.2 |
| 9 | 6.0 | 1.1 | 69.6 |
| 10 | 6.2 | 1.3 | 71.6 |
| 11 | 6.4 | 1.5 | 67.2 |
| 12 | 6.6 | 1.7 | 54.7 |
| 13 | 7.0 | 1.1 | 59.4 |
| 14 | 7.2 | 1.3 | 63.2 |
| 15 | 7.4 | 1.5 | 66.0 |
| 16 | 7.6 | 1.7 | 61.1 |
| 17 | 8.0 | 1.1 | 61.8 |
| 18 | 8.2 | 1.3 | 65.6 |

[1] A 2.0 ml. aliquot was taken from the acylation mix, stripped in vacuo, diluted to 20 mls. with pH 7.00 phosphate buffer and sent for bioassay. Yields are not corrected for input pen V potency.

[2] % Ampicillin in Solution =

$$\frac{(\text{Bioassay mcg/ml})(20 \text{ mls.})(\text{Volume of Acylation mix})}{(2 \text{ mls.})(1000 \text{ mcg/mg})(1000 \text{ mg/gm})(\text{Theoretical Yld in gms})} \times 100$$

TABLE II

The Effect of Temperature on Ampicillin Yields in Solution[1]

| Run No. | Moles of DMA for Acylation | Moles of PGH for Acylation | Acylation Temperature | % Ampi in Soln. |
|---|---|---|---|---|
| 19 | 6.2 | 1.3 | −50° C. | 81.0 |
| 20 | 6.2 | 1.3 | −40° C. | 88.9 |
| 21 | 6.2 | 1.3 | −30° C. | 85.5 |
| 22 | 6.2 | 1.3 | −20° C. | 85.5 |
| 23 | 6.2 | 1.3 | −10° C. | 87.5 |

[1] Yields are corrected for input pen V potency.

Somewhat higher yields were noted at temperatures above −50° (Run Nos. 20–23). Interestingly, the rate of dissolution of the acid chloride was virtually instantaneous at −10°, whereas it requires 20 minutes at −50°.

Bioassay data tend to indicate that better yields of ampicillin are obtained using the controlled addition of 25 ea. of methanol to chlorimide (compare bio yields in Table I with Table II). Thus, several isolation variations were carried out using this methylation technique, some of which are illustrated in Table III.

TABLE III

Isolation Conditions and Yields of Ampicillin Trihydrate*

| Run No. | Chem Assay in mcg/mg | % of Theory | Yield in gms. | % Yld. | Method of Isoln. |
|---|---|---|---|---|---|
| 24 | 853;856 | 98.7 | 4.17 | 70 | 1[a] |
| 25 | 810;811 | 93.8 | 15.8 | 76 | 1 |
| 26 | 817;812 | 94.1 | 5.4 | 77 | 2[b] |
| 27 | 848;855 | 98.3 | 16.6 | 79 | 2 |
| 28 | 849;853 | 98.3 | 66.6 | 68 | 2 |
| 29 | 820 | 94.7 | 12.2 | 50 | 3[c] |

*Yields are not corrected for purity.
[a] DMA removed by vacuum distillation at pH 7 (3.0N NaOH used for pH adjustment); NSA/MILA.
[b] DMA removed by extraction (MIBK) at pH 7 (6N NH₄OH used for pH adjustment); NSA/MILA.
[c] DMA removed by extraction (MIBK) at pH 7 (6N NH₄OH used for pH adjustment) direct crystallization of ampicillin by pH adjustment.

Workup in all cases consisted of aqueous quench of acylation mix at 0–5°. No emulsions were observed at this stage. The organic layer was removed and the aqueous was processed as follows:

Isolation method 1 involved adjustment of the rich aqueous with 3 N sodium hydroxide to pH 7–7.5. In addition to encountering an emulsion, a gummy solid precipitated during this step which was removed with difficulty via diatomaceous earth ("Dicalite") treatment and filtration. The formation of this solid, however, was precluded by continuous pH adjustment at pH 7.5, but pH control was difficult. The two phase mix (DMA and aqueous) was concentrated at 50° in vacuo to complete DMA removal. Slow acidification with aqueous β-naphthalenesulfonic acid (NSA) gave ampicillin NSA salt. The conversion of the wet NSA cake to ampicillin trihydrate using MIBK-LA-1 resin (MILA) gave yields up to 70–75% of good quality product.

Isolation method 2 involved adjustment of the rich aqueous with 6 N ammonium hydroxide to pH 7–7.5 in the presence of MIBK. An amorphous solid was found in addition to an emulsion, but was easily removed by filtration with added "Dicalite". The MIBK layer containing DMA was removed and the clean aqueous processed via NSA/MILA to good quality ampicillin trihydrate.

Method 3 consisted of removal of the DMA by solvent extraction (MIBK) at pH 7–7.5 (6 N ammonium hydroxide used for pH adjustment), followed by direct crystallization of the ampicillin by pH adjustment. The yields were considerably lower (Table 3) using this technique.

Either of these three methods is capable of yielding good quality ampicillin trihydrate in reasonably good yields from penicillin V Method 2 has thus far processed most smoothly of the three methods.

The acylation to ampicillin was also investigated using other bases such as triethylamine, imidazole and pyridine. The yields respectively in each case (bioassay of acylation mix) under best conditions were 55% (6.5 eq. TEA, 1.4 eq. PGH), 27.2% (5 eq. imidazole, 1.1 eq. PGH) and 30% (20 eq. pyridine, 1.1 eq. PGH). These yields were all lower than those obtained using DMA.

Using the best conditions thus far obtained, an acylation of the resulting solution of 6-APA with D-(-)-2-(4-hydroxyphenyl)glycyl)chloride hydrochloride PHPGH) was examined at −40° using 6.2 eq. DMA/1.3 eq. PHPGH. Bioassay data indicated yields of amoxicillin in solution approaching 85% average on three occasions.

The silyl esters of the process of the present invention are made, for example, by the use of such agents as are described in U.S. Pat. Nos. 3,499,909, 3,249,622, 3,654,266, 3,678,037, 3,741,959 and 3,694,437, e.g., trimethyl chlorosilane, hexamethyl disilazane, triethyl chlorosilane, methyl trichlorosilane, dimethyl dichlorosilane, triethyl bromosilane, tri-n-propyl chlorosilane, bromomethyl dimethyl chlorosilane, tri-n-butyl chlorosilane, methyl diethyl chlorosilane, dimethyl ethyl chlorosilane, phenyl dimethyl bromosilane, benzyl methyl ethyl chlorosilane, phenyl ethyl methyl chlorosilane, triphenylchlorosilane, triphenyl fluorosilane, tri-o-tolyl chlorosilane, tri-p-dimethylaminophenyl chlorosilane, N-ethyl triethylsilylamine, hexaethyl disilazane, triphenyl silylamine, tri-n-propyl silylamine, tetraethyl dimethyl disilazane, tetramethyl diethyl disilazane, tetramethyl diphenyl disilazane, hexaphenyl disilazane, hexa-p-tolyl disilazane, etc. The same effect is produced by hexa-alkylcyclotrisilazanes, or octaalkylcyclotetrasilazanes. Other suitable silylating agents are silylamides and silylureides such as a trialkylsilylacetamide and a bis-trialkylsilylacetamide.

For optimum results, it is preferred to use high concentrations of the reactants. For example, in the formation of the silyl esters a 20 to 30%, preferably 25% by weight of the penicillin is suspended in an inert organic solvent and a base for the best results. The preferred base is N,N-dimethylaniline. Depending upon the specific starting material, the silane is employed preferably in a slight excess i.e. 10 to 60%, above theoretical amounts. This enables the use of solvents which are not absolutely dry because trace amounts of water are removed therefrom by reacting with the excess silylating agent.

Examples of suitable alcohols for forming the imino ethers are primary and secondary alcohols having the general formula $R_6OH$ in which $R_6$ is selected from the group consisting of (A) alkyl, having 1 to 12 carbon atoms, preferably at least 3 carbon atoms, such as methanol, ethanol, propanol, isopropanol, n-butanol, amylalcohol, decanol, etc.; (B) phenylalkyl having 1 to 7 alkyl atoms, such as benzylalcohol, 2-phenylethanol-1, etc.; (C) cyloalkyl, such as cyclohexylalcohol, etc.; (D) hydroxyalkyl having 2 to 12 carbon atoms, preferably at least 3 carbon atoms, such as 1.6 hexanediol, etc.; (E) alkoxyalkyl having 3 to 12 carbon atoms, such as 2-methoxyethanol, 2-isopropxyethanol, 2-butoxyethanol, etc.; (F) aryloxyalkyl having 2 to 7 carbon atoms in the aliphatic chain such as 2-p-chlorophenoxyethanol, etc.; (G) aralkoxyalkyl, having 3 to 7 carbon atoms in the aliphatic chain, such as 2-(p-methoxybenzyloxy)-ethanol, etc.; (H) hydroxyalkoxyalkyl, having 4 to 7 carbon atoms, such as diglycol. Also, mixtures of these alcohols are suitable for forming the imino ethers.

For use as the anhydrous, unreactive organic solvent a wide range of anhydrous non-hydroxylic organic solvents are suitable, including hydrocarbons, such as benzene and toluene; chlorinated solvents such as methylene chloride, chloroform, ethylene dichloride and chlorobenzene; ethers such as diethyl ether, dioxane and tetrahydrofuran; and other conventional solvents such as methyl isobutyl ketone, dimethylformamide, ethyl acetate and acetonitrile.

Among these solvents, methylene chloride, chloroform, acetonitrile, and ethyl acetate are particularly useful. Since the halosilanes and silylated products are decomposed by moisture and other hydroxylic agents, solvents employed as reaction media must be substantially anhydrous and free from alcoholic impurities.

Useful weak tertiary bases include N,N-dimethylaniline, pyridine, any lutidine and quinoline; the term weak means those such amines having dissociation constants in the range of from $10^{-8}$ to $10^{-11}$.

The halogenating agents include agents forming imide halides and, more specifically acid halides, particularly chlorides, which are derived from phosphorus, sulfur, carbon or their oxygen acids, for example phosphorus oxychloride, phosphorus pentachloride, phosphorus trichloride, thionyl chloride, phosgene, oxalyl chloride.

The following examples are given in illustration of, but not in limitation of, the present invention. All temperatures are in degrees Centigrade. 7-Aminocephalosporanic acid is abbreviated as 7-ACA, methyl isobutyl ketone as MIBK and tetrahydrofuran as THF. "Skellysolve B" is a petroleum ether fraction of B.P. 60–68°C. consisting essentially of n-hexane.

LA-1 resin is a mixture of secondary amines wherein each secondary amine has the formula

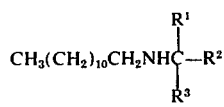

wherein each of $R^1$, $R^2$ and $R^3$ is a monovalent aliphatic hydrocarbon radical and wherein $R^1$, $R^2$ and $R^3$ contain in the aggregate from eleven to fourteen carbon atoms. This particular mixture of secondary amines, which is sometimes referred to in these examples as "Liquid Amine Mixture No. II", is a clear amber liquid having the following physical characteristics: viscosity at 25°C. of 70 cpd., specific gravity at 20°C. of 0.826; refractive index at 25°C. of 1.4554; distillation range at 10 mm., up to 170°C - 0.5%, 170–220°C. - 3%, 220°–230°C. - 90% and above 230°C. - 6.5%.

DESCRIPTION OF THE PREFERRED EMBODIMENTS

MATERIALS — Example 1

| Step | Compound | Wt., g. | Volume, ml. | Moles | Eq.[1] |
|------|----------|---------|-------------|-------|--------|
| A. | Penicillin VK | 1000 | — | 2.57 | 1.00 |
| | Methylene chloride | — | 5000 | — | — |
| | N,N-Dimethylaniline | 936 | 975 | 7.72 | 3.00 |
| | Dichlorodimethylsilane | 366 | 342 | 2.83 | 2.20 |
| B. | Methylene chloride | — | 5000 | — | — |
| | Phosphorous Pentachloride | 643 | — | 3.09 | 1.20 |
| C. | Methanol | 2064 | 2613 | 64.37 | 25.0 |
| D. | Water | 362 | 362 | 20.0 | 7.83 |
| E. | N,N-Dimethylaniline | 1934 | 2015 | 15.96 | 6.20 |
| | D-(-)-phenylglycyl chloride Hydrochloride[2] | 750 | — | 3.35 | 1.30 |
| F. | Water | — | 4000 | — | — |
| | MIBK | — | 8000 | — | — |
| | 6N Ammonium Hydroxide | — | 4500 | — | — |
| | BNSA (NSA; Beta-naphthalene sulfonic acid) | — | 3500 | — | — |
| | 15% MILA[3] | — | 10900 | — | — |

[1] Moles/mole penicillin VK salt.
[2] Based on 92% pure D-(-)-phenylglycyl chloride hydrochloride.
[3] This refers to a 15% Weight/Volume solution of LA-1 resin in methyl isobutyl ketone.

PROCEDURE

All solvents should be dried, preferably with molecular sieves.

Step A. Esterification

1. Potassium penicillin V (1000 g., 2.57 moles) is suspended in anhydrous methylene chloride (5000 ml.) with gentle stirring at 25° undeer a nitrogen atmosphere.

2. N,N-Dimethylaniline (975 mls., 7.72 moles) is added to the slurry over a 5 minute period. No temperature rise was observed on a lab scale of 100 g. of K pen V.

3. Dichlorodimethylsilane (342 mls., 2.83 moles) is added over 15 to 20 minutes with gentle stirring at 25°. An exothermic reaction ensues raising the temperature to 35°–38° during the addition, resulting in the dissolution of the pen V K salt. The silylation mix is stirred for 45–60 minutes after the addition.

Step B. Chlorination

1. Methylene chloride (5000 ml.) is added to the above clear yellow solution of silylation mix at 25° and the mixture is then cooled to −40° to −45°.

2. Phosphorous pentachloride (643 g., 3.09 moles) is added in one portion with high speed agitation at −40° to −45°. The temperatures rises to −35° to −38° and then falls to −40° to −45° over a 10–15 minute period. At this time nearly complete solution occurs and the mixture turns dark brown.

3. The chlorination mixture is stirred for 2 hours at −40° to −45°.

Step C. Methylation

1. The above chlorination mix is cooled to −60° to −65°.

2. Anhydrous methanol (2615 mls. 64.4 moles) precooled to −65° is added very slowly to the vigorously agitated chlorination mix such that the temperature is held between −55° and −50°. After the addition of about 1100 mls., the mixture turns nearly colorless. The reaction is very exothermic and care should be taken not to exceed −50° during the earlier part of the addition of methanol.

3. Methylation is allowed to proceed at −50° to −52° for 2 hours.

Step D. Hydrolysis

1. Water at 25° (362 mls., 20.1 moles, 2.6% V/V) is added over 5–10 minutes to the above light yellow solution at −50°.

2. Single phase hydrolysis is allowed to proceed for 1 hour at −50°.

Step E. Acylation

1. N,N-Dimethylaniline (2015 mls., 15.96 moles) is added to the hydrolysis mix over a 15–20 minute period. The temperature rises about 4° during this period, and the solution turns dark green. After about 1000 mls. are added, the mixture becomes a thick green slurry.

2. The slurry is warmed to −40° and solid D-(-)-phenylglycyl chloride hydrochloride (749.5 g., 3.35 moles) is added portionwise over 15–20 min. The reaction is slightly exothermic and the temperature rises to −35° and falls to −40° over a 10 min. period. Solution becomes complete during this period. The mixture is stirred at −40° for 45 minutes.

3. The mixture is warmed to −10° over a 30–45 min. period and 4000 mls. of water (25°) is added over 10–15 min. with good agitation. The phases are separated and the methylene chloride layer is saved for solvent recovery.

4. The aqueous layer (pH 1.3) is layered with methyl isobutyl ketone (MIBK; 1000 mls.) and the pH is slowly adjusted to 7.5 – 7.7 over 10–15 min. with 0°–5°C. 6N ammonium hydroxide (4000 ml.). The emulsion is treated with 100 g. of diatomaceous earth ("Dicalite") and polish filtered and the cake washed with water (500 ml.) and MIBK (500 mls.).

5. The layers are separated and the aqueous layered with an equal volume of MIBK (about 2000 mls.).

6. With high speed agitation, the pH is slowly adjusted to 1.5–1.7 with β-naphthalenesulfonic acid (NSA) (2500–3000 mls.) over a 1 hour period at a rate of additon of NSA of 50 mls./min. When nucleation begins, the mixture is cooled to 0°–5° over 1–2 hours.

7. The slurry is stirred at 0°–5° for 2 hours, filtered and the cake washed with cold (0°–5°) water (2000 mls.) and 25° C. MIBK (2000 mls.).

8. The cake is sucked as dry as possible and slurried with high speed agitation in 15% of MILA (10,900 mls.) and water (1360 mls.) for 3 hours.

9. The ampicillin trihydrate is collected by filtration and displacement washed with cold (0°–5° C.) water (2000 mls.) and MIBK (2000 mls.) and oven dried at 45° for 18 hours. The yield of snow white trihydrate is 705–829 g. (68–80%); IR and NMR are consistant for structure. Biopotency indicates 97–99% purity. Chem. potency indicates about 97–99% purity.

EXAMPLE 2

Ampicillin Trihydrate

Potassium penicillin V (100.0 g., 257,42 moles) was slurried in dry methylene chloride (500 ml.) under nitrogen, and N,N-dimethylaniline (97.48 ml., 93.58 g., 772.26 mmole, 3.0 eq.) was added in one portion at 25°. Dimethyldichlorosilane (34.16 ml., 36.56 g., 283.16 mmole, 2.19 eq) was added over 1–2 min. at 25°. The temperature rose to 35°–37° during the addition and fell to 25°–27° over 15–20 min. The mixture was stirred for a total of 30–45 min. and methylene chloride (500 ml.) was added. The solution was cooled to −40° to −45° and phosphorous pentachloride (64.33 g., 308.9 mmole, 1.2 eq.) was added in one portion at −40°. The temperature rose to −35° and fell to −40° over 10–12 min. The chlorination was allowed to proceed for 2 hours at −40° to −45°. The solution was cooled to −60° and precooled methanol (−60°, 261.3 mls., 206.4 g., 6.45 moles, 25 eq.) was added dropwise very carefully maintaining the temperature below −50°. The addition required about 20 min. Methylation was allowed to proceed for 2 hours at −50°. Water at 25° (36.2 mls., 36.2 g., 2011 mmole, 7.81 eq., 2.6 V/V%) was added over 1 min. at −50° and single phase hydrolysis was allowed to proceed at −50° for 1 hour. N,N-dimethylaniline (201.46 ml., 193.4 g., 6.2 eq.) was added slowly over −36 min. at −50°. After the addition, the mixture containing a green slurry was warmed to −40° over a 5–10 min. period. D-(-)-2-phenylglycyl chloride hydrochloride (assay 90% purity, 74.95 g., 363.73 mmole, 1.3 eq.) was added in one portion at −40°. Acylation was allowed to proceed at −40° for 40 minutes. The mixture was warmed to −10° and water (1000 ml.) was added over 5–10 minutes. The temperature rose to about 5° C. during the addition. The layers were separated, and the aqueous was layered with methylene chloride (300 ml.) at 0°–5°. "Dicalite" (5 g.) was added and the pH was adjusted to 7.5 with 6 N ammonium hydroxide (about 390 ml.) with high speed stirring maintaining the temperature at about 5°. The resulting emulsion was filtered and the layers were separated. The aqueous was layered with an equal volume of methyl isobutyl ketone at 5°–10°. the pH was adjusted very slowly to 1.5 with 35% aqueous β-naphthalenesulfonic acid (NSA) solution (about 225 ml.) at a rate of about 2.0 ml./min. The solution was seeded at pH 3.5 and the slurry allowed to stir for 1.5 hours at about 10° and then cooled to 0°–5°. The slurry was held for 16 hours at 0°–5° and the product collected by filtration and displacement washed with water (0°–5°) followed by methyl isobutyl ketone (25°). The cake was sucked as dry as possible and the slurry transferred to a tared beaker. A solution (MILA) of LA-1 resin in methyl isobutyl ketone (15% W/V) was added based on 200 mls./50 g. wet cake and water was added based on 25 mls./50 g. wet cake. The slurry was stirred vigorously for 3 hours, filtered and washed with cold (0°–5°) water, methyl isobutyl ketone and oven dried at 45° for 18 hours giving 66.6 g. (68%) of snow white ampicillin trihydrate. Infrared and NMR spectra were completely consistent for structure: β-lactam potency was 856 mcg./mg. and the biopotency was 851 mcg./mg. indicating a purity of about 99%.

EXAMPLE 3 p-Hydroxyampicillin (Amoxicillin)

Potassium penicillin V (25.0 g., 64.36 mmoles) was slurried in dry methylene chloride (100 mls.), followed by the addition of N,N-dimethylaniline (24.37 mls., 23.40 g., 193.08 mmoles) at 25° C. under nitrogen. Dimethyldichlorosilane (8.54 mls., 9.14 g., 70.79 mmoles) was added and the solution allowed to silylate for 1 hour. Methylene chloride (100 mls.) was added and the solution cooled to −40° C., and phosphorous pentachloride (16.1 g., 77.23 mmoles) was added in one portion. Chlorination was allowed to proceed for 1.5 hours at −40° C. The solution was cooled to −60° C. and pre-cooled methanol (−60° C.; 65.3 mls., 51.6 g., 1609 mmoles) was added dropwise over a 15 minute period. During the addition of methanol, the temperature was not allowed to exceed −50° C., and methylation was allowed to proceed for 2 hours at −50° C. Water (2.6% V/V, 7.8 mls.) was added at −50° C. and hydrolysis allowed to proceed for 45 minutes at −50° C. N,N-Dimethylaniline (50.37 mls., 48.36 g., 398.92 mmoles) was added over a 5 minute period at −50° C. The solution was warmed to −40° C. and D-(-)-2-(4-hydroxyphenyl)glycyl chloride hydrochloride (90% pure; 20.64 g., 92.96 mmoles) was added at −40° C. and as soon as solution of the acid chloride was complete, a ml. aliquot was taken, stripped, dissolved in 20 mls. pH 7.0 buffer and sent for bioassay. Bioassay indicated 85% amoxicillin in solution. Two more runs were run under the same conditions and bioassay yields in solution were 82% and 89%. The average yield in solution was 85%.

EXAMPLE 4

Substitution in the procedure of Example 3 for the D-(-)-2-(4-hydroxyphenyl)glycyl chloride hydrochloride of an equimolar weight of another acid chloride produces epicillin by the use of D-(-)-2-amino-2-amino-2-(1,4-cyclohexadien-1-yl)acetyl chloride hydrochloride and cyclacillin by the use of 1-aminocyclohexanecarboxyl chloride hydrochloride and methicillin by the use of 2.6-dimethoxybenzoyl chloride and nafcillin by the use of 2-ethoxy-1-naphthoyl chloride and oxacillin by the sue of 5-methyl-3-phenyl-4-isoxazole-carbonyl chloride and cloxacillin by the use of 5-methyl-3-(2'-chlorophenyl)-4-isoxazole-carbonyl chloride and dicloxacillin by the use of 5-methyl-3-(2',6'-dichlorophenyl)-4-isoxazole-carbonyl chloride and flucloxacillin (floxacillin) by the use of 5-methyl-3-(2'-chloro-6'-fluorophenyl)-4-isoxazole-carbonyl chloride and indanyl carbenicillin by the use of 5-indanyl phenylmalonyl chloride and 6-[D-β-(3-guanyl-1-ureido)-phenylacetamido]-penicillanic acid by the use of D-α-(3-guanyl-1-ureido)phenylacetyl chloride hydrochloride and levopropylcillin by the use of (-)-2-phenoxybutyryl chloride and sulfocillin (sulbenicillin; sulfobenzylpenicillin) by the use of α-sulphophenylacetyl chloride and azidocillin by the use of D-(-)-α-azidophenylacetyl chloride and 3,4-dichloro-α-methoxybenzylpenicillin by the use of 3,4-dichloro-α-methoxyphenylacetyl chloride and 6-[D-m-chloro-p-hydroxyphenylacetamido]penicillanic acid (U.S. Pat. No. 3,489,746) by the use of D-(-)-2-m-chloro-p-hydroxyphenylglycyl chloride hydrochloride and 6-[D-α-amino-(2-thienyl)acetamido] penicillanic acid by the use of D-(-)-α-(2-thienyl)-glycyl chloride hydrochloride and 6-[D-α-amino-(3-thienyl)acetamido]penicillanic acid by the use of D-(-)-2-(3-thienyl)glycyl chloride hydrochloride.

The amphoteric penicillins are isolated by the procedure of Example 2 and the others by conventional methods, e.g. extraction into alkaline water and back-extraction at an acidic pH into a water-immiscible organic solvent from which, after drying the solution, they are precipitated in salt form as by the addition of sodium 2-ehtylhexanoate.

We claim:

1. In the process for producing a synthetic penicillin from a natural penicillin by the consecutive steps of
   a. forming a solution in an anhydrous, unreactive organic solvent of a silyl ester of said natural penicillin in the presence of a weak tertiary amine,
   b. adding at below 0° C. a halogenating agent to form a solution of the imino-halide,
   c. mixing said solution at below −20° C. with alcohol to form a solution of the imino-ether,
   d. mixing said solution with water to produce 6-aminopenicillanic acid in a biphasic system,
   e. isolating said 6-aminopenicillanic acid as a solid,
   f. redissolving it in a solvent and
   g. adding thereto a carboxylic acid chloride as an acylating agent to produce said synthetic penicillin,
the improvment which comprises maintaining the imino-ether solution in the hydrolysis step at −50°C. while adding a volume of water no greater than 10% of the volume of the imino-ether solution to produce a single phase containing 6-aminopenicillanic acid which is then, without intermediate isolation of the 6-aminopenicillanic acid, acylated at about −40° C.

after the addition of a weak tertiary amine to produce said synthetic penicillin.

2. The process of claim 1 wherein the synthetic penicillin so produced is ampicillin and the acylating agent is D-(-)-2-phenylglycyl chloride hydrochloride.

3. The process of claim 1 wherein the synthetic penicillin so produced in amoxicillin and the acylating agent is D-(-)-2-p-hydroxyphenylglycyl chloride hydrochloride.

4. The process of claim 1 wherein the synthetic penicillin so produced is epicillin and the acylating agent is D-(-)-2-amino-2-(1,4-cyclohexadien-1-yl)acetyl chloride hydrochloride.

5. The process of claim 1 wherein the synthetic penicillin so produced is cyclacillin and the acylating agent is 1-aminocyclohexanecarboxyl chloride hydrochloride.

6. The process of claim 1 wherein the synthetic penicillin so produced is methicillin and the acylating agent is 2,6-dimethoxybenzoyl chloride.

7. The process of claim 1 wherein the synthetic penicillin so produced is nafcillin and the acylating agent is 2-ethoxy-1-naphthoyl chloride.

8. The process of claim 1 wherein the synthetic penicillin so produced is oxacillin and the acylating agent is 5-methyl-3-phenyl-4-isoxazole-carbonyl chloride.

9. The process of claim 1 wherein the synthetic penicillin so produced is cloxacillin and the acylating agent is 5-methyl-3-(2'-chlorophenyl)-4-isoxazolecarbonyl chloride.

10. The process of claim 1 wherein the synthetic penicillin so produced is dicloxacillin and the acylating agent is 5-methyl-3-(2',6'-dichlorophenyl)-4-isoxazolecarbonyl chloride.

11. The process of claim 1 wherein the synthetic penicillin so produced is flucloxacillin and the acylating agent is 5-methyl-3-(2'-chloro-6'-fluorophenyl)-4-isoxaxole-carbonyl chloride.

12. The process of claim 1 wherein the synthetic penicillin so produced is indanyl carbenicillin and the acylating agent is 5-indanyl phenylmalonyl chloride.

13. The process of claim 1 wherein the synthetic penicillin so produced is 6-[D-α-(3-guanyl-1-ureido)-phenylacetamido]-penicillanic acid and the acylating agent is D-α-(3-guanyl-1-ureido)phenylacetyl chloride hydrochloride.

14. The process of claim 1 wherein the synthetic penicillin so produced is levopropylcillin and the acylating agent is (-)-2-phenoxybutyryl chloride.

15. The process of claim 1 wherein the synthetic penicillin so produced is sulfocillin and the acylating agent is α-sulphophenylacetyl chloride.

16. The process of claim 1 wherein the synthetic penicillin so produced is azidocillin and the acylating agent is D-(-)-α-axidophenylacetyl chloride.

17. In the process for producing a synthetic penicillin from penicillin G or penicillin V by the consecutive steps of
 a. forming a solution in an anhydrous, unreactive organic solvent of a silyl ester of said penicillin in the presence of a weak tertiary amine,
 b. adding at below −20° C. an acid halide to form a solution of the imino-halide,
 c. mixing said solution at below −40° C, with a lower alkanol to form a solution of the imino-ether,
 d. mixing said solution with water to produce 6-aminopenicillanic acid in a biphasic system,
 e. isolating said 6-aminopenicillanic acid as a solid,
 f. redissolving it in a solvent and
 g. adding thereto a carboxylic acid chloride as an acylating agent to produce said synthetic penicillin,
the improvement which comprises maintaining the imino-ether solution in the hydrolysis step at −50° C. while adding a volume of water about 2.5 to 6% of the volume of the imino-ether solution to produce a single phase containing 6-aminopenicillanic acid which is then, without intermediate isolating of the 6-aminopenicillanic acid, acylated at about −40° C. after the addition of a weak tertiary amine to produce said synthetic penicillin.

18. The process of claim 17 wherein the synthetic penicillin so produced is ampicillin and the acylating agent is D-(-)-2-phenylglycyl chloride hydrochloride.

19. The process of claim 17 wherein the synthetic penicillin so produced is amoxicillin and the acylating agent is D-(-)-2-p-hydroxyphenylglycyl chloride hydrochloride.

20. The process of claim 17 wherein the synthetic penicillin so produced is epicillin and the acylating agent is D-(-)-2-amino-2-(1,4-cyclohexadien-1-yl)acetyl chloride hydrochloride.

21. The process of claim 17 wherein the synthetic penicillin so produced is cyclacillin and the acylating agent is 1-aminocyclohexanecarboxyl chloride hydrochloride.

22. The process of claim 17 wherein the synthetic penicillin so produced is methicillin and the acylating agent is 2,6-dimethoxybenzoyl chloride.

23. The process of claim 17 wherein the synthetic penicillin so produced is nafcillin and the acylating agent is 2-ethoxy-1-naphthoyl chloride.

24. The process of claim 17 wherein the synthetic penicillin so produced is oxacillin and the acylating agent is 5-methyl-3-phenyl-4-isoxazole-carbonyl chloride.

25. The process of claim 17 wherein the synthetic penicillin so produced is cloxacillin and the acylating agent is 5-methyl-3-(2'-chlorophenyl)-4-isoxazolecarbonyl chloride.

26. The process of claim 17 wherein the synthetic penicillin so produced is dicloxacillin and the acylating agent is 5-methyl-3-(2',6'-dichlorophenyl)-4-isoxazolecarbonyl chloride.

27. The process of claim 17 wherein the synthetic penicillin so produced is flucloxacillin and the acylating agent is 5-methyl-3-(2'-chloro-6'-fluorophenyl)-4-isoxazolecarbonyl chloride.

28. The process of claim 17 wherein the synthetic penicillin so produced is indanyl carbenicillin and the acylating agent is 5-indanyl phenylmalonyl chloride.

29. The process of claim 17 wherein the synthetic penicillin so produced is 6-[D-α-(3-guanyl-1-ureido)-phenylacetamido]-penicillanic acid and the acylating agent is D-α-(3-guanyl-1-ureido)phenylacetyl chloride hydrochloride.

30. The process of claim 17 wherein the synthetic penicillin so produced is levopropylcillin and the acylating agent is (-)-2-phenoxybutyryl chloride.

31. The process of claim 17 wherein the synthetic penicillin so produced is sulfocillin and the acylating agent is α-sulphophenylacetyl chloride.

32. The process of claim 17 wherein the synthetic penicillin so produced is azidocillin and the acylating agent is D-(-)-α-azidophenylacetyl chloride.

33. In the process for producing a synthetic penicillin from penicillin G or penicillin V by the consecutive steps of
   a. forming a solution in an anhydrous, unreactive organic solvent of a silyl ester of said natural penicillin in the presence of dimethylaniline,
   b. adding at below −40° C. phosphorus pentachloride to form a solution of the imino-halide,
   c. mixing said solution at below −40° C. with a lower alkanol to form a solution of the imino-ether,
   d. mixing said solution with water to produce 6-aminopenicillanic acid in a biphasic system,
   e. isolating said 6-aminopenicillanic acid as a solid,
   f. redissolving it in a solvent and
   g. adding thereto a carboxylic acid chloride as an acylating agent to produce said synthetic penicillin, the improvement which comprises maintaining the iminoether solution in the hydrolysis step at −50° C. while adding a volume of water about 2.5 to 6% of the volume of the imino-ether solution to produce a single phase containing 6-aminopenicillanic acid which is then, without intermediate isolation of the 6-aminopenicillanic acid, acylated at about −40° C. after the addition of a weak tertiary amine to produce said synthetic penicillin.

34. The process of claim 33 wherein the synthetic penicillin so produced is ampicillin and the acylating agent is D-(-)-2-phenylglycyl chloride hydrochloride.

35. The process of claim 33 wherein the synthetic penicillin so produced is amoxicillin and the acylating agent is D-(-)-2-p-hydroxyphenylglycyl chloride hydrochloride.

36. The process of claim 33 wherein the synthetic penicillin so produced is epicillin and the acylating agent is D-(-)-2-amino-2-(1,4-cyclohexadien-1-yl)acetyl chloride hydrochloride.

37. The process of claim 33 wherein the synthetic penicillin so produced is cyclacillin and the acylating agent is 1-aminocyclohexanecarboxyl chloride hydrochloride.

38. The process of claim 33 wherein the synthetic penicillin so produced is methicillin and the acylating agent is 2,6-dimethoxybenzoyl chloride.

39. The process of claim 33 wherein the synthetic penicillin so produced is nafcillin and the acylating agent is 2-ethoxy-1-naphthoyl chloride.

40. The process of claim 33 wherein the synthetic penicillin so produced is oxacillin and the acylating agent is 5-methyl-3-phenyl-4-isoxazole-carbonyl chloride.

41. The process of claim 33 wherein the synthetic penicillin so produced is cloxacillin and the acylating agent is 5-methyl-3-(2'-chlorophenyl)-4-isoxazolecarbonyl chloride.

42. The process of claim 33 wherein the synthetic penicillin so produced is dicloxacillin and the acylating agent is 5-methyl-3-(2',6'-dichlorophenyl)-4-isoxazolecarbonyl chloride.

43. The process of claim 33 wherein the synthetic penicillin so produced is flucloxacillin and the acylating agent is 5-methyl-3-(2'-chloro-6'-fluorophenyl)-4-isoxazolecarbonyl chloride.

44. The process of claim 33 wherein the synthetic penicillin so produced is indanyl carbenicillin and the acylating agent is 5-indanyl phenylmalonyl chloride.

45. The process of claim 33 wherein the synthetic penicillin so produced is 6-[D-α-(3-guanyl-1-ureido)-phenylacetamido]-penicillanic acid and the acylating agent is D-α-(3-guanyl-1-ureido)phenylacetyl chloride hydrochloride.

46. The process of claim 33 wherein the synthetic penicillin so produced is levopropylcillin and the acylating agent is (-)-2-phenoxybutyryl chloride.

47. The process of claim 33 wherein the synthetic penicillin so produced is sulfocillin and the acylating agent is α-sulphophenylacetyl chloride.

48. The process of claim 33 wherein the synthetic penicillin so produced is azidocillin and the acylating agent is D-(-)-α-azidophenylacetyl chloride.

49. In the process for producing a synthetic penicillin from penicillin V by the consecutive steps of
   a. forming a solution in anhydrous methylene chloride of a silyl ester of said penicillin V made by reaction of said penicillin V with dichlorodimethylsilane or hexamethyl-disilazane or trimethylchlorosilane in the presence of dimethylaniline,
   b. adding at below −40° C. phosphorus pentachloride to form a solution of the imino-halide,
   c. mixing said solution at below −40° C. with methanol to form a solution of the imino-ether,
   d. mixing said solution with water to produce 6-aminopenicillanic acid in a biphasic system,
   e. isolating said 6-aminopenicillanic acid as a solid,
   f. redissolving it in a solvent and
   g. adding thereto a carboxylic acid chloride as an acylating agent to produce said synthetic penicillin, the improvement which comprises maintaining the imino-ether solution in the hydrolysis step at −50° C. while adding a volume of water about 2.5 to 6% of the volume of the imino-ether solution to produce a single phase containing 6-aminopenicillanic acid which is then, without intermediate isolation of the 6-aminopenicillanic acid, acylated at about −40° C. after the addition of dimethylaniline to produce said synthetic penicillin.

50. The process of claim 49 wherein the synthetic penicillin so produced is ampicillin and the acylating agent is D-(-)-2-phenylglycyl chloride hydrochloride.

51. The process of claim 49 wherein the synthetic penicillin so produced is amoxicillin and the acylating agent is D-(-)-2-p-hydroxyphenylglycyl chloride hydrochloride.

52. The process of claim 49 wherein the synthetic penicillin so produced is epicillin and the acylating agent is D-(-)-2-amino-2-(1,4-cyclohexadien-1-yl)acetyl chloride hydrochloride.

53. The process of claim 49 wherein the synthetic penicillin so produced is cyclacillin and the acylating agent is 1-aminocyclohexanecarboxyl chloride hydrochloride.

54. The process of claim 49 wherein the synthetic penicillin so produced is methicillin and the acylating agent is 2,6-dimethoxybenzoyl chloride.

55. The process of claim 49 wherein the synthetic penicillin so produced is nafcillin and the acylating agent is 2-ethoxy-1-naphthoyl chloride.

56. The process of claim 49 wherein the synthetic penicillin so produced is oxacillin and the acylating agent is 5-methyl-3-phenyl-4-isoxazole-carbonyl chloride.

57. The process of claim 49 wherein the synthetic penicillin so produced is cloxacillin and the acylating agent is 5-methyl-3-(2'-chlorophenyl)-4-isoxazolecarbonyl chloride.

58. The process of claim 49 wherein the synthetic penicillin so produced is dicloxacillin and the acylating agent is 5-methyl-3-(2',6'-dichlorophenyl)-4-isoxazolecarbonyl chloride.

59. The process of claim 49 wherein the synthetic penicillin so produced is flucloxacillin and the acylating agent is 5-methyl-3-(2'-chloro-6'-fluorophenyl)-4-isoxazolecarbonyl chloride.

60. The process of claim 49 wherein the synthetic penicillin so produced is indanyl carbenicillin and the acylating agent is 5-indanyl phenylmalonyl chloride.

61. The process of claim 49 wherein the synthetic penicillin so produced is 6-[D-$\alpha$-(3-guanyl-1-ureido)-phenylacetamido]-penicillanic acid and the acylating agent is D-$\alpha$-(3-guanyl-1-ureido)phenylacetyl chloride hydrochloride.

62. The process of claim 49 wherein the synthetic penicillin so produced is levopropylcillin and the acylating agent is (-)-2-phenoxybutyryl chloride.

63. The process of claim 49 wherein the synthetic penicillin so produced is sulfocillin and the acylating agent is $\alpha$-sulphophenylacetyl chloride.

64. The process of claim 49 wherein the synthetic penicillin so produced is azidocillin and the acylating agent is D-(-)-$\alpha$-azidophenylacetyl chloride.

65. The process of claim 49 wherein the synthetic penicillin so produced is 3,4-dichloro-$\alpha$-methoxybenzyl penicillin and the acylating agent is 3,4-dichloro-$\alpha$-methoxyphenylacetyl chloride.

66. The process of claim 49 wherein the synthetic penicillin so produced is 6-[D-m-chloro-p-hydroxyphenylacetamido]penicillanic acid and the acylating agent is D-(-)-2-m-chloro-p-hydroxyphenylglycyl chloride hydrochloride.

67. The process of claim 49 wherein the synthetic penicillin so produced is 6-[D-$\alpha$-amino-(2-thienyl)-acetamido]penicillanic acid and the acylating agent is D-(-)-$\alpha$-(2-thienyl)-glycyl chloride hydrochloride.

68. The process of claim 49 wherein the synthetic penicillin so produced is 6-[D-$\alpha$-amino-(3-thienyl)-acetamido] penicillanic acid and the acylating agent is D-(-)-2-(3-thienyl)glycyl chloride hydrochloride.

\* \* \* \* \*